June 17, 1969     G. W. TEMPEL     3,451,032
ELECTROMECHANICAL TRANSDUCER MATERIAL
Filed July 15, 1966
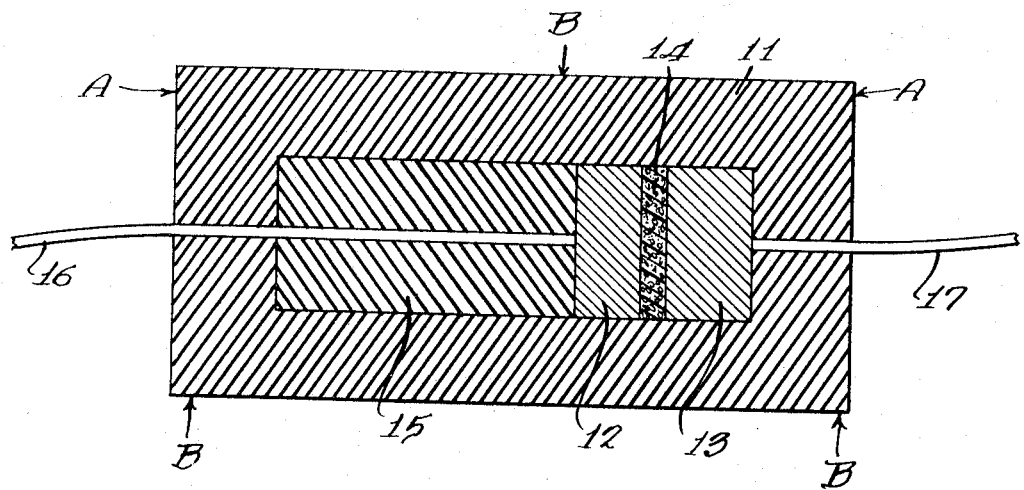
Inventor
Gerhard W. Tempel
By Hofgren, Wegner,
Allen, Stellman & McCord
Atty's

United States Patent Office 3,451,032
Patented June 17, 1969

3,451,032
ELECTROMECHANICAL TRANSDUCER MATERIAL
Gerhard W. Tempel, Waterloo, Iowa, assignor to Omsteel Industries, Inc., a corporation of Nebraska
Filed July 15, 1966, Ser. No. 565,479
Int. Cl. H01c *13/00;* H01b *1/06*
U.S. Cl. 338—114                    17 Claims

ABSTRACT OF THE DISCLOSURE

A transducer material which can be used between opposing electrodes for pressure-sensitive electrode mechanical applications. The material includes a solid body, e.g., a membrane, of pressure-sensitive, semi-conductor material, having opposed separate faces for contact with the electrodes and including a continuous phase, i.e., of plastic, glass or natural gum, defining a solid non-conductive matrix and permanently and uniformly dispersed colloidal electrically conductive particles, e.g., colloidal graphite, spaced in homogeneous non-coagulated suspension within and throughout the material of said matrix. The transducer material is thermally stable and retains the semi-conductor effect of the conductive particles and can be compressed for changing its electrical properties. It can be enclosed in a force transmitting casing. The transducer can have a straight line resistance changer per unit of applied force and preferably has a resistance of at least 5,000 ohms with the output:input ratio predetermined by the amount of conductive material based on matrix material.

---

This invention relates to transducers capable of converting an input into an electrical output. The invention more particularly relates to the use of semi-conductor materials containing finely divided conductive particles disposed between opposing electrodes in a transducer.

Commercial transducers now available are unreliable for use in many applications due to changes in their resistance properties, or the like, under conditions of use. As another disadvantage, the transducers are often not reproducible; that is, using the same methods of manufacture with the same starting materials, the resulting transducer usually does not have the same input:output ratio, and as a result many replacement transducers are sold on the basis of 50% conformity with the values of the original transducer.

Various forms of transducers are available. Among these the most prominent are those that convert mechanical, chemical or electrical inputs into electrical outputs. These transducers which have electrical outputs are the type with which the present invention is concerned. Such transducers can be used to measure or detect mechanical forces, to measure or detect changes in chemical environment such as pH, to measure, modify or detect an electrical signal or a change in frequency or other signal property, to function as a condenser, and in many other applications.

It is a general object of this invention to provide a new transducer including a composition or structure which is useful as sensitive material between electrodes in the transducer.

Another object of the invention is to provide a transducer which is reliable and which does not change its resistance under influence of a wide range of input forces applied to the transducer.

Still another object of the invention is to provide a new and useful set of transducers having generally the same input:output ratios varying only a small amount, e.g. less than 5%, from each other.

Yet another object of this invention is to provide an encased transducer structure in the form of a pressure gauge or the like which includes a pressure-sensitive solid composition or structure and a casing through which applied pressure can be transmitted to the pressure-sensitive material.

A further object is to provide a new and useful composition or structure according to the foregoing object wherein the pressure-sensitive material is a body containing colloidal allotropic carbon or other conductive particulate material which is uniformly and permanently dispersed throughout a matrix such that the electrical semi-conductivity of the carbon particles is retained.

Another object is to provide a structure for use as a pressure-sensitive element in a transducer wherein the structure is in the form of a membrane contacting opposing electrodes in contact areas of preselected size to provide a preselected working power rating.

Another object of this invention is to provide a transducer according to any of the foregoing objects including colloidal electrically conductive material within a matrix where the amount of conductive material is preselected and the thickness of the pressure-sensitive material is predetermined to provide a preselected output:input ratio for the pressure-sensitive material.

Another undesirable characteristic of available transducers, such as wire transducers, is the curved line relation between resistance and applied force. In such transducers variances in resistance change are often noted when the same force is applied. Further, the curved line relation requires additional equipment to convert it to a straight line relation for accurate readout by gauges and other devices which are calibrated for linear response directly proportional to the signal received.

It is another object of this invention to provide transducers having straight line change in resistance output responsive to applied input force.

Still another object is to provide such straight line response transducers which are capable of accurately and consistently converting any specific input within a wide range to a specific proportional output value.

Yet another object of this invention is to provide a transducer having a material between the electrodes which locates and suspends conductive particles in evenly spaced disposition and retains the particles tightly in place.

It is a further object to provide such a transducer according to the foregoing object in which the material is pressure responsive and has a modulus of elasticity and resilience rendering the material compressible at an even rate whereby the conductive particles are moved toward each other at an even rate during the application of a mechanical force, resulting in a straight line relation between applied force and change in resistance of the transducer material.

Previously the use of carbon particles has been conventional in the manufacture of electro-mechanical transducers such as microphones and the like which convert high mechanical loads to current pulses. Such transducers usually consist of a casing filled with carbon granules between a pair of electrodes, and the casing is provided with a compressible wall or the like, which may constitute one of the electrodes, for transmitting a mechanical force to be applied to the transducer. For example, a simple modern microphone is basically a metal cup filled with carbon granules with a movable metallic diaphragm mounted in contact with the granules across the open end of the cup. The diaphragm is electrically insulated from the cup, and separate lead wires are attached to the cup and diaphragm and connected into an electric circuit. When sound waves, i.e. energy, strike the diaphragm, the diaphragm vibrates, varying the pressure on the carbon granules. The current in the circuit varies with the resistance of the body of carbon granules, and the resistance varies with the pressure on the carbon granules. The change in current in the circuit actuates a telephone receiver.

It has been found that in the simple microphone and other transducers where the carbon granules are provided in a medium of air or the like, conditions of excessive application of mechanical force can cause the carbon granules to pack so that they no longer function properly. For example, in a microphone, sound waves at a high amplitude, independent of frequency, can lock the carbon granules in a nearby solid block form so that the microphone can then no longer transmit intelligible signals. A similar situation exists if the carbon granules are loaded with a static load. Thus, conventional transducers are not acceptable in such high impact applications as measuring impact of a driven concrete breaking tool.

It is another general object of this invention to provide a new composition and structure which is useful as a pressure-sensitive material in a transducer and overcomes the problem of packing and has other advantageous transducer properties rendering it useful for a variety of purposes.

Another object is to provide such a composition and structure in which electrically conductive particles are positively suspended against packing and are still capable of movement relative to each other sufficient to produce an intelligible and accurate output even in very high impact use, e. g. in a concrete breaking tool.

Still another object of this invention is to provide a new and useful solid, pressure-sensitive body having an electrical output responsive to mechanical input.

Another object of this invention is to provide a transducer having electrically conductive particles dispersed in the matrix wherein the matrix has a high modulus of elasticity such that the transducer is useful as a pressure gauging device.

Yet another object of this invention is to provide a transducer including electrically conductive particles dispersed in the matrix wherein the matrix has a low modulus of elasticity such that the transducer is useful as a switching or monitoring device.

Other objects will be apparent from the following description and from the drawing in which the figure is an enlarged partial sectional schematic illustration of a transducer device illustrating a form of the present invention.

While this invention is susceptible of embodiment in many different forms, there is shown in the drawing and will herein be described in detail a specific embodiment of the invention with the understanding that the present disclosure is to be considered as an exemplification of the principles of the invention and is not intended to limit the invention to the embodiment illustrated.

The transducers of the present invention include a pair of electrodes having a pressure-responsive mass disposed therebetween. The mass is preferably a solid mass which holds electrically conductive particles in spaced relation with respect to each other, and the mass is compressible so that the conductive particles can be moved toward each other responsive to force for changing the resistance of the mass and generating a change in electrical output signal and is usually resilient so that it will return to its original shape. Generally, the transducers can have either curved line or straight line applied force: resistance change characteristics. For example, it has been found that the materials having a resistance of about 2000 ohms or less are characterized by curved line responses, while those materials having at least about 5000 ohm resistance are characterized by straight line responses. The latter are especially advantageous since the output can be used directly as a straight line directly proportional indication of the applied force. Although other conductive particles can be used, the transducers preferably include carbon, such as carbon black or graphite, as the conductive material.

In one form, the present invention provides an electromechanical transducer device which is capable of converting mechanical input into an electrical output. Such a device includes a solid, pressure-sensitive conductive material which is usually resilient and has opposed separate faces. The pressure-sensitive material includes a continuous phase defining a non-insulating matrix and also includes permanently dispersed colloidal allotropic carbon or other electrically conductive particles. The suspension of carbon particles is homogeneous throughout the matrix. The composition of the matrix is such as to retain the electrical semi-conductivity of the carbon or other particles, and the matrix is compressible by applied pressure and is thermally stable at the use temperature of the transducer. The transducer also includes a pair of opposing electrodes separated from each other and in facial contact with the respective opposed separate faces of the pressure-sensitive material.

Referring to the figure, there is shown a transducer in the form of a pressure gauge for sensing loads AA, BBB or AA+BBB, as indicated in the figure. The pressure gauge includes a cylindrical, resilient, semi-rigid plastic casing 11 around an assembly of two electrodes 12 and 13 of a conductive material. A disc-shaped membrane 14 is provided between and in facial contact with the electrodes 12 and 13. A resilient semi-rigid plastic spacer 15 fills the space between electrode 12 and the inner end wall of casing 11. The membrane 14 is of a conductive pressure-sensitive material, and in the illustrated form membrane 14 is a solid body of gum arabic containing tannic acid as a dispersing agent and forming a matrix. Colloidal carbon particles of a few molecules in size are uniformly and permanently dispersed throughout the matrix. The carbon content of the illustrated device is 5% by weight, and the matrix also includes 2.5% by weight of tannic acid, as a dispersing agent.

Leads 16 and 17 are provided from electrodes 12 and 13 and extend through bores in the spacer 15 and casing 11, as shown, to the exterior of the casing 11. Leads 16 and 17 are to be connected in a circuit containing a pick-up for responding to the change in current in the circuit whenever such change is produced by the pressure gauge.

As another aspect, the present invention provides a composition of matter from which the pressure-sensitive material is formed. The composition is a formulation of non-insulating material which constitutes a homogeneous continuous phase of a carrier material containing colloidal allotropic carbon or other conductive material in a proper amount to provide the desired transducer effect in the pressure-sensitive material. The formulation preferably also contains sufficient dispersing agent, e.g. a solution of dispersing agent in a suitable solvent, for dispersing the carbon in the carrier in the usual manner for dispersing agents. The dispersing agent, or solution thereof, is compatible with the carrier material and actually constitutes a portion of the continuous phase.

Where a casing is used, the casing should be capable of transmitting the input forces to the pressure-sensitive material and should also be strong enough to survive the intended conditions of use. Where the transducer is intended to receive a series of separate consecutive input forces during its use, the casing should be sufficiently resilient to recover as each input force is relieved.

The following are offered as examples of the preparation of pressure-sensitive material formulations and are not to be taken as limitations on the invention.

*Example I*

As a more specific example of the preparation of a pressure-sensitive material, tannic acid is dissolved in an equal amount by weight of benzene. An amount of colloidal graphite equal in weight to the tannic acid solution is added, and the resulting mixture is mixed in a colloidal mill for 30 minutes. Four parts by weight of gum arabic are then added, and the mixture is milled to obtain a homogeneous solution. The composition thus produced is then placed between the surfaces of the mating electrodes and is permitted to air-dry. The resulting transducer can be encased in a suitable casing for use as a switching device or a pressure-sensitive push button. It has a low resistance of only a few hundred ohms and a curved line response; i.e. input force plotted against change in resistance is a curved line.

*Example II*

As another specific example, Example I is repeated except that nine parts by weight of gum arabic are added. This is the transducer used to prepare the specific device described above with reference to the figure. The transducer has a resistance of about 3000 ohms and has a more expanded curved line response than in Example I.

*Example III*

A solution of tannic acid in an equal amount by weight of benzene was prepared. An amount of colloidal carbon equal in weight to the tannic acid solution was added, and the mixture was mixed in a colloidal mill until homogenous. A binder system was prepared by melting solid polypropylene pellets and adding foundry core sand in an amount equal to one-half the weight of the plastic. The binder material was maintained molten, and 10% by weight of the carbon dispersion was added to the top of the molten mix. The carbon dispersion was immediately sucked into the molten mix, and the mix was permitted to solidify. The composition was applied between the surfaces of mating electrodes and was permitted to solidify. The electrodes with the composition between them were assembled into an insulated steel shell with an insulated lead protruding through the shell from each electrode. The resulting transducer has a straight line response, i.e. applied input force plotted against change in resistance of the transducer is a straight line. The transducer was tested for accuracy by applying separate and consecutive varying forces between 12 and 100 lbs. constantly for 2 weeks, and the transducer was found to have a constant reading throughout the test period. The accuracy of the straight line response was verified by testing from 10,000 ohms down to 4000 ohms.

*Example IV*

An amount of predispersed carbon was weighed and placed in a heat-resistant mold for molding a thin disc. Glass laboratory stirring rods were melted with a blow torch, and a drop of the molten glass weighing about ten times the weight of the carbon dispersion was added to the predispersed carbon to fill the mold. During addition of the molten glass the predispersed carbon gave off vapors but the carbon did not burn. The resulting molded material was removed from the mold and adhered between two facing electrodes and was assembled into an insulated steel casing as in Example III. The assembled transducer had a straight line response as high as 10,000,000 ohms and the response was tested down to 1,000,000 ohms and found to be accurate.

High resistance straight line response transducers made generally according to this invention have been found to have accurate straight line responses down to less than 1 ohm, and it is possible to extend the straight line response upward without limit by using less compressible materials as the matrix for the conductive particles.

As a still further aspect, the present invention provides, as an article of manufacture, the pressure-sensitive material which is formed from the formulation and constitutes a solid continuous phase of the non-insulating material defining a solid matrix containing the colloidal conductive particles as permanently and uniformly dispersed particles. The matrix is pressure-sensitive in that it is capable of compression by mechanical forces applied to it such that the mechanical forces change the disposition of the carbon particles relative to each other for changing the electrical resistance through the mass.

The device of the figure can readily be manufactured by assembling the leads, electrodes, membrane and spacer and casting a plastic material in the form of casing 11 around the resulting assembly. Leads 16 and 17 can be used to suspend the assembly centrally in a cylindrical mold during casting. The membrane 14 is formed by solidifying a melt or evaporating solvent from a formulation of the matrix containing a carrier material, a dispersing agent solution and carbon in situ between electrodes 12 and 13. Usually leads 16 and 17 are attached to the electrodes prior to forming the membrane 14. Alternatively, the membrane 14 can be formed in a separate mold and placed between the electrodes. Lead 16 is then threaded through the small bore in spacer 15 to provide the assembly around which casing 11 is molded.

Casing 11 and spacer 15 are of a non-conductive material or are electrically insulated from electrodes 12 and 13, leads 16 and 17 and membrane 14.

The resilient solid membrane 14 is a semi-conductor, due to the presence of the conductive carbon particles, and changes its resistance responsive to mechanical force. In the transducer, the membrane is in facial contact with the electrodes over a sufficient contact area to provide the desired or preselected working power rating. The greater contact area provides a higher rating, and the power rating increases with increased contact area. For example, a plurality of devices as shown in the figure were produced from the same membrane composition in disc shapes of the same thickness, but having different diameters. The power ratings varied according to diameter, i.e. contact area with the electrodes, as follows:

| Diameter, inches: | Power rating, watts |
| --- | --- |
| .12 | 0.3 |
| .38 | 1.0 |
| .50 | 1.5 |
| .75 | 3.5 |
| 1.00 | 6.0 |
| 1.25 | 9.0 |

The colloidal carbon or other conductive material is included in the amount required for the particular use of the transducer, even in major amounts by weight of the total pressure-sensitive material. The amount used should not be so great as to not be dispersable in the carrier. Usually the amount is in the range of 0.1 to 10% and the preferred range is 1 to 10%. The range of response sensitivity of the transducer can be varied widely by varying the proportion of carbon in the pressure-sensitive composition and also by varying the thickness of the pressure-sensitive material. The less conductive material present in the structure and/or the thinner the structure, the heavier the loads which can be effectively gauged or otherwise handled, and conversely the less conductive material and/or the thicker the structure, the lighter the loads which can be handled. In this manner, a preselected input:output ratio for the pressure-sensitive material can be provided. In some cases a predominance of carbon can cause unreliability in the device and in such cases it is best not to exceed about 10% by weight carbon.

The modulus of elasticity of the matrix material can vary widely. Where the matrix material has a high modulus of elasticity, the pressure-sensitive material is especially useful in transducers to be used as pressure gauging devices. Where the matrix has a low modulus of elasticity, the transducer is especially useful in the form of a switching or monitoring device.

The matrix includes the normally solid carrier material and the dispersing agent. The matrix and the carrier material are described herein as "non-insulating" and by this it is meant that although these materials are non-conductive, they also do not insulate the carbon particles to such an extent as to destroy the semi-conductivity or semi-conductor effect provided by the carbon or other conductive particles in the matrix. The carriers include such materials as the natural and synthetic gums, polyester plastics, polyolefin plastics, glass, porcelain, non-conductive metals, other plastic materials, and the like.

The usual dispersing agents are used for dispersing the conductive particles. For example, any of the known carbon dispersants can be used as the dispersing agent for carbon, or colloidal graphites can be purchased which have their own dispersing tendency, and these can be used while eliminating or decreasing the amount of dispersing agent.

The purpose of the dispersing agent is to suspend the particles in the carrier as a medium. The particles are of the average size of a few molecules and are readily dispersible by the dispersing agent. Limited Brownian movement of the particles may be useful during the dispersing operation. The dispersing agent is selected to also counterbalance any molecular charge in the carrier. For this purpose, the preferred dispersing agents are organic acids, especially weak acids such as tannic acid and dextrin or other sugar acids which have been found to be quite reliable and are economical. For example, tannic acid can be used in a dispersing amount sufficient to balance the molecular charge of a gum arabic carrier but insufficient to introduce an electrical molecular charge in an amount affecting the reliability of the pressure-sensitive material.

The amount of dispersing agent should not be so much as to increase Brownian movement much beyond what is useful for dispersing the particles. A transducer produced from a pressure-sensitive material in which the particles have excessive Brownian movement is not stable and in use and, if loaded, permits a latent breakthrough of the electrical molecular charge which will always appear as an addition to the regular current reading, resulting in erroneous readings.

Conversely, the carrier generally balances any electrical charge of the dispersing agent. Often the dispersing agents, especially organic acids, tend to insulate the conductive particles to some extent. The carrier material is of a non-insulating nature so as to decrease or dilute the insulating effect and enhance semi-conductivity of the conductive particles. Gum arabic has been found to be especially effective when used with tannic acid or one of the sugar acids as the dispersing agent for carbon particles.

The dispersing agent is usually completely dissolved in a suitable solvent and is included as a solution in the formulation from which the pressure-sensitive material is formed. Excesses of solvent are not necessary and only require more extended removal procedures. The dispersing agent is used in an amount sufficient to disperse the amount of conductive particles used, and as a rule, approximately an equal amount of dispersing agent or solution thereof can be used, based on the weight of conductive particles. Usually, the dispersing agent or solution comprises up to 10% and preferably 1 to 10% by weight of the overall pressure-sensitive material, although much greater amounts can be used. The carrier is usually present in an amount from about 80 to about 98% by weight, or more, based on the total pressure-sensitive material, but much lesser amounts can be used where a greater proportion of conductive material is desired.

Where a solvent for the dispersing agent is desired or necessary to increase compatibility with the carrier material, any known low boiling or volatile solvent for the dispersing agent can be selected. Usually the solvent is a low boiling hydrocarbon such as benzene, pentane, a light petroleum fraction, blended gasoline, or the like, although other volatile solvents such as ether, esters, alcohols, acids, and the like, can be used. Use of a solvent is not entirely necessary since the dispersing agent can be mixed with a melt of the carrier. Also, it is possible to eliminate the dispersing agent entirely or at least decrease the amount of dispersing agent used by dispersing a colloidal conductive material within a solution or melt of the carrier by the use of electrophoresis or by other means.

It is an advantage of this invention that following the same method of manufacture the transducer materials are precisely reproducible, and never in such an instance has the reproduced transducer varied in its response by more than one-half of 1%; usually differences in response between the transducers are unmeasurable. In the high resistance straight line response transducers, the very wide range of operation permits the use of the transducers with systems employing only a simple ohm meter having a multiplication scale. In such use the operator can roughly read the broad scale and then zero in on a particular range of the scale for a more accurate reading using only the normal ohm meter system. The long linear relation between force applied and resistance response permits accurate readings anywhere over a broad spectrum.

All percentages given herein are percentages by weight unless otherwise indicated.

I claim:

1. An electromechanical transducer for converting a mechanical input into a generally straight line electrical output, which comprises a solid body of pressure-sensitive, semi-conductor material having opposed separate faces and including a continuous phase defining a solid non-porous non-conductive mass, a dispersing agent, and individual collodial electrically conductive particles permanently uniformly dispersed with said dispersing agent and spaced in homogeneous non-coagulated suspension within and throughout the material of said matrix, in an amount imparting the semi-conductor effect, said pressure-sensitive material retaining the semi-conductor effect of the conductive particles, being compressible by applied pressure and being thermally stable at the use temperature of the transducer, and a pair of opposing electrodes separated from each other by said matrix with each electrode in facial contact with a separate one of said faces.

2. The transducer of claim 1 wherein the conductive particles are colloidal allotropic carbon particles.

3. The transducer of claim 1 including a casing having a force transmitting wall for compressing said pressure-sensitive material and wherein said electrodes have conductive leads projecting through the casing.

4. The transducer of claim 3 wherein said electrodes are contained within the casing in direct contact therewith and said casing is of non-conductive material.

5. The transducer of claim 1 wherein said composition is in the form of a membrane having sufficient opposing generally parallel contact areas with the respective surfaces of said opposing electrodes for providing a preselected working power rating.

6. The transducer of claim 1 wherein said matrix has a high modulus of elasticity and said transducer is in the form of a pressure gauging device.

7. The transducer of claim 1 wherein said matrix has a low modulus of elasticity and said transducer is in the form of a switching or monitoring device.

8. The transducer of claim 1 wherein the amount of carbon based on the matrix is preselected and the thickness of the pressure-sensitive material is predetermined to provide a preselected output:input ratio for the pressure-sensitive material.

9. The transducer device of claim 1 characterized by a resistance of at least 5,000 ohms and a straight line resistance change per unit of applied force.

10. The device of claim 1 wherein said conductive particles consist essentially of 1–10% by weight graphite, based on total weight of the matrix material.

11. The device of claim 1 wherein said matrix material is selected from the class consisting of plastics, vitreous materials and normally solid organic compounds.

12. The device of claim 11 wherein said matrix is gum arabic.

13. The transducer of claim 1 wherein said dispersing agent is an organic acid.

14. The transducer of claim 13 wherein said matrix material is gum arabic, and said organic acid is selected from the class consisting of tannic acid and sugars containing the group

15. The electromechanical transducer of claim 1 wherein said dispersing agent is present in an amount from about 1 to about 10 percent and the material of said non-porous mass is present in an amount in the range of 80 to 98 percent by weight of the total composition of said semi-conductor material.

16. The electromechanical transducer of claim 1 wherein the spacing between said conductive particles is the same as the spacing of said particles in a liquid by Brownian movement and the Brownian movement of the particles in the mass is insufficient to render said semiconductor material unstable with respect to latent breakthrough of electrical molecular charge.

17. The electromechanical transducer of claim 1 characterized by a long linear relation between applied force and resistance response between 1 million and 10 million ohms.

References Cited

UNITED STATES PATENTS

| | | | |
|---|---|---|---|
| 2,427,481 | 9/1947 | Weible et al. | 106—141 |
| 2,951,817 | 9/1960 | Myers. | |
| 2,734,978 | 2/1956 | Bulgin | 338—114 |
| 2,375,178 | 5/1945 | Ruben | 338—99 X |
| 3,125,739 | 3/1964 | Deibel et al. | 338—99 |
| 2,305,717 | 12/1942 | La Bell | 338—114 |

ROBERT K. SCHAEFER, *Primary Examiner.*

H. J. HOHAUSER, *Assistant Examiner.*

U.S. Cl. X.R.

252—511, 512